Patented May 11, 1926.

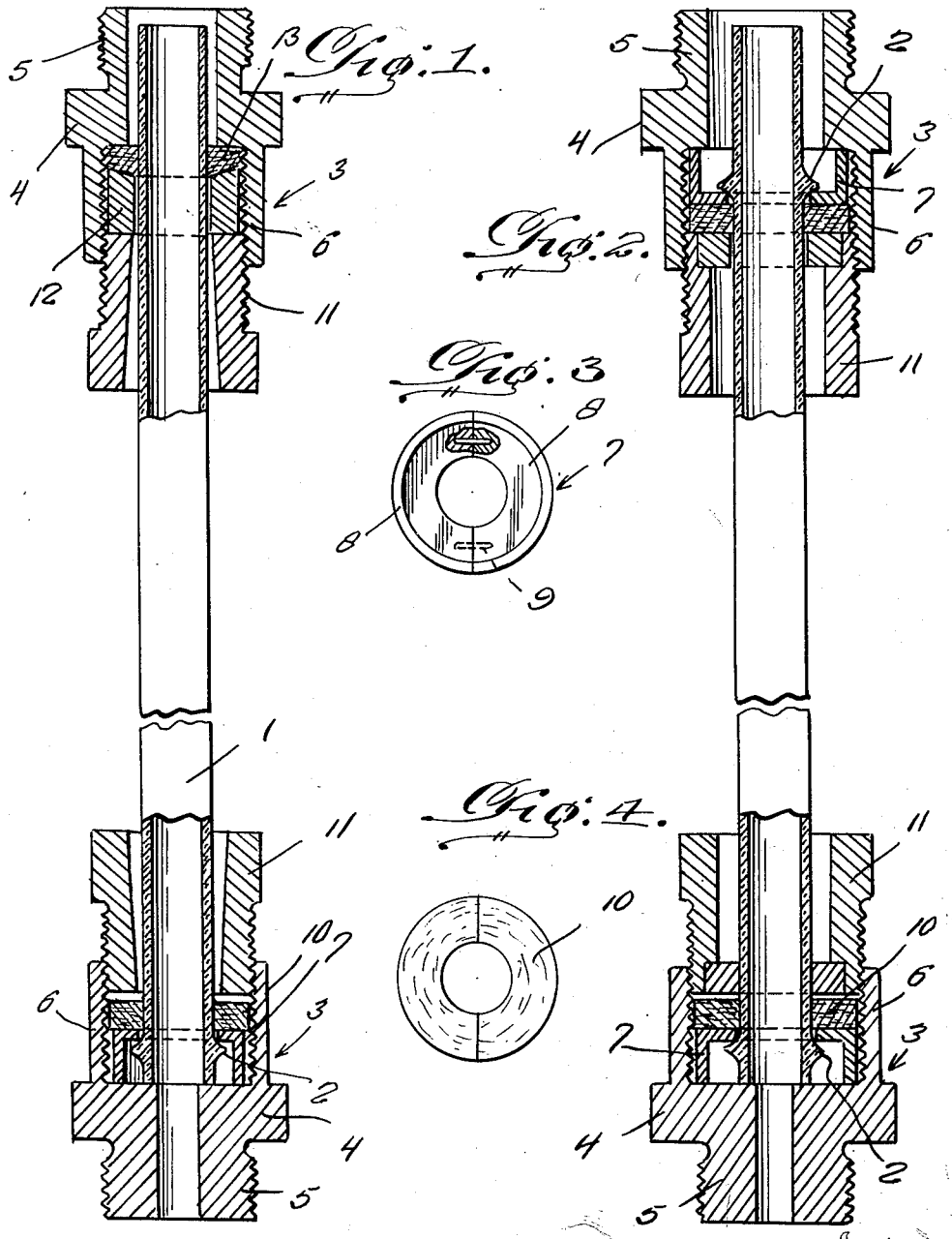

1,584,394

UNITED STATES PATENT OFFICE.

JOHN P. MUNLEY, OF ARCHBALD, PENNSYLVANIA.

GAUGE GLASS.

Application filed September 24, 1925. Serial No. 58,315.

This invention relates to an improved gauge tube or glass which is used for registering the quantity of water on locomotives, stationary engines, steam boilers, etc.

The principal object of the invention is to generally improve upon devices of this class by providing one of comparative simplicity and durability, which is such in construction as to render it highly successful in operation, and inexpensive to both the manufacturer and the user.

The principal feature of the invention is the means employed for forcing compressible packing into tight contact with the glass tube to afford a fluid-tight joint and then to undue leakage.

Other features and advantages of the invention will become apparent from the following description and drawing.

In the accompanying drawing forming a part of this application, and in which like numerals are employed to designate like parts throughout the same:

Figure 1 is a view in section and elevation of one embodiment of the invention.

Fig. 2 is a like view of a slightly different embodiment of the invention.

Fig. 3 is a top plan of one of the details.

Fig. 4 is a detail view of one of the packing rings.

Referring to the drawings in detail, the reference character 1 designates an open ended flange tube. In Fig. 1, this tube is provided adjacent one end with a flange 2 forming a shoulder. The opposite end is plane, that is, there is no flange. In Fig. 2, however, the flange 2 is duplicated at the end of the tube.

Considering this part of the invention first, it will be seen that the reference character 3 designates generally an improved fitting. The fitting comprises a central outstanding flat faced portion 4 adapted to accommodate a wrench or the like. On one side of this portion is a screw threaded nipple, and on the other side is an internally screw threaded annular flange 6 forming a part of a depending box.

It will be noted that the flange is disposed in a manner to permit the formation of a shoulder at the center of the fitting. Arranged in this stuffing box is a two-part cup-shaped washer 7. The parts or sections 8 of this washer are fastened together by pins 9. The inturned flanges of these parts are adapted to surround the glass tube adjacent the flange 2. The cup-washer constitutes a rest for a sectional rubber packing ring 10. This ring is of compressible rubber. A packing gland 11 is threaded into the flange 6 and is adapted to bear against and to compress the packing ring 10 to force it into fluid-tight contact with the glass tube 1. Thus, we have a shouldered flange tube with a special coupling and fitting thereon. The fitting includes a stuffing box of novel construction wherein the compressible packing is forced into fluid-tight contact with the tube to prevent leakage.

In Fig. 1, at the top, a substantially simpler construction is provided except that there is no shoulder on the glass tube and the fitting is thus allowed to be slid up and down on the tube to compensate for adjustment. In this construction, the shouldered fitting 3 is duplicated. Therefore the same reference character is applied.

Moreover, a packing gland 11 is utilized which is threaded into the flange 6. Instead of employing a cup-shaped washer, a two-part brass ring 12 is employed and this ring is provided with a beveled end to engage the beveled side of a compressible packing ring 13 which rests on the shoulder on the inside of the fitting 3. This arrangement forces the packing into tight contact with the glass tube, but by unscrewing the packing gland 11, the packing will be loosened sufficiently to allow the entire connection to be moved up or down on the glass tube.

A careful consideration of the drawings and description will serve to enable a clear comprehension of the invention to be had. Therefore a more lengthy description is thought unnecessary.

While the preferred embodiment of the invention has been shown and described, it will be understood that changes coming within the field of invention claimed, may be resorted to if desired.

Having thus described my invention, what I claim as new is:—

In a structure of the class described, a glass tube provided with an external shoulder, a fitting into which said shouldered end of the tube extends, said fitting comprising a body including a central wrench engaging portion, an internal shoulder, a screw threaded nipple extending from the wrench engaging portion on one side, a flange extending from said portion on the opposite side, a cup-shaped washer arranged in said fitting and resting on said shoulder and cooperable with the shoulder on said tube, a compressible packing ring resting upon said washer, and a packing gland threaded into said flange, and adapted to compress the packing against said washer.

In testimony whereof I affix my signature.

JOHN P. MUNLEY.